(12) United States Patent
Taylor

(10) Patent No.: US 7,989,397 B2
(45) Date of Patent: Aug. 2, 2011

(54) METHODS AND COMPOSITIONS RELATING TO THE REDUCTION OF VOLATILE PHOSPHORUS FROM CRUDE

(75) Inventor: Robert S. Taylor, Calgary (CA)

(73) Assignee: Halliburton Energy Services, Inc., Duncan, OK (US)

( * ) Notice: Subject to any disclaimer, the term of this patent is extended or adjusted under 35 U.S.C. 154(b) by 563 days.

(21) Appl. No.: 11/998,734

(22) Filed: Nov. 30, 2007

(65) Prior Publication Data

US 2009/0143260 A1    Jun. 4, 2009

(51) Int. Cl.
*C09K 8/52* (2006.01)

(52) U.S. Cl. .......... 507/90; 507/128; 507/269; 507/271; 507/274; 507/276

(58) Field of Classification Search .......... None
See application file for complete search history.

(56) References Cited

U.S. PATENT DOCUMENTS

| | | | | | |
|---|---|---|---|---|---|
| 2,062,866 | A | * | 12/1936 | Coleman | 423/308 |
| 3,528,771 | A | * | 9/1970 | Bird et al. | 423/320 |
| 3,865,922 | A | * | 2/1975 | Boontje | 423/166 |
| 4,080,311 | A | * | 3/1978 | Kehl | 502/208 |
| 4,927,614 | A | * | 5/1990 | Langer | 423/305 |
| 6,133,205 | A | | 10/2000 | Jones | 507/276 |
| 6,511,944 | B2 | * | 1/2003 | Taylor et al. | 507/237 |
| 7,314,850 | B2 | * | 1/2008 | Taylor et al. | 507/238 |
| 2004/0214728 | A1 | * | 10/2004 | Taylor et al. | 507/235 |
| 2007/0173413 | A1 | * | 7/2007 | Lukocs et al. | 507/238 |

* cited by examiner

*Primary Examiner* — John J Figueroa
(74) *Attorney, Agent, or Firm* — Robert A. Kent; McDermott Will & Emery LLP

(57) ABSTRACT

This invention relates to methods and compositions useful in treating crude sources, and more specifically, to methods and compositions useful in reducing the concentration of phosphorus in crude streams and hydrocarbon flowback fluids. In some embodiments, the present invention provides methods that include a method comprising: providing a crude stream or a hydrocarbon flowback fluid; optionally testing the crude stream or the hydrocarbon flowback fluid for total phosphorus content; optionally testing the crude stream or hydrocarbon flowback fluid for volatile phosphorus content; adding a solution comprising a trivalent metal ion to the crude stream or the hydrocarbon flowback fluid; adding a sufficient amount of a caustic solution to the crude stream or the hydrocarbon flowback fluid to raise the pH of the stream or the fluid to about 8 or more; allowing at least a plurality of precipitates to form; removing at least one precipitate; and forming a clean crude stream or a clean hydrocarbon flowback fluid.

16 Claims, No Drawings

METHODS AND COMPOSITIONS RELATING TO THE REDUCTION OF VOLATILE PHOSPHORUS FROM CRUDE

BACKGROUND

The present invention relates to methods and compositions useful in treating crude sources, and more specifically, to methods and compositions useful in reducing the concentration of phosphorus in crude streams recovered from subterranean formations. Additionally, the invention relates to reducing volatile phosphorus in hydrocarbon flowback fluids.

"Crude" as that term is used herein refers to any hydrocarbon that is a liquid at standard conditions. An example would be unrefined petroleum or liquid petroleum. The term "hydrocarbon flowback fluid" is generally defined as the hydrocarbon treatment fluid used in a subterranean application, e.g., a fracturing operation wherein the fluid is initially injected into the oil well during fracturing, and later flowed back out of the well as a natural consequence of returning the oil well to production. A hydrocarbon flowback fluid may comprise produced fluids from the subterranean formation including, but not limited to, crude, water, and dissolved gases, which may include those hydrocarbons which exist as gases at standard conditions, such as a gas chosen from the group consisting of: methane, ethane, propane, butane, and iso-butane. A hydrocarbon flowback fluid may be considered a type of crude stream if it will be further refined.

Recently, many crude oil refiners in North America have experienced greater than anticipated equipment surface fouling of their refining units. For example, since 1995, refinery distillation tower plugging has been observed in some refineries processing Canadian sweet light crude. There also has been increased fouling of heat exchangers. Additionally, there is the potential for phosphorus to damage engines and catalytic converters if it is not removed prior to being used in a fuel stream.

Because these increased fouling problems dictate more frequent shutdowns for cleaning, the net business result can be a significant increase in the overall costs of operation. These financial consequences can have far-reaching effects, especially given the price of gasoline in today's market. Additionally, due to similar problems that have been encountered with Canadian crude, there is potential for devaluation of the crude.

It is believed that one source of this fouling is the presence of phosphorus in the crude streams and hydrocarbon flowback fluids being refined. The phosphorus components are typically present in small, but measurable, amounts (e.g., usually about 5,000 ppm or less) as a result of being injected into oil wells where the crude or the hydrocarbon flowback fluid is recovered. Hydrocarbon flowback fluids may contain about 1000 ppm or less. Crude from pipelines may contain about 30 ppm or less, with concentrations of about 2 to about 8 ppm being somewhat common.

Phosphorus may be introduced into a subterranean formation from which hydrocarbons may be produced through the use of gelled fluids that may contain phosphorus-based gelling agent systems. Fracturing the subterranean formation surrounding a well bore is thought to produce channels in the rock so that productivity can be maximized. Use of an organic fluid during fracturing usually serves to reduce problems associated with water-sensitive formations. Gelling agents serve to viscosify the fluid, allowing proppant to be suspended in the fluid so that it may be transported downhole to be placed in fractures resulting from the fracturing treatment. Gelled oil fracturing fluids that comprise phosphate ester gelling agents are examples of such fluids. Another example of a reversible gelling agent is a metal soap of a partially esterified phosphate. The viscosity of the fluid may ultimately be reduced for recovery.

The large increase in fouling rates observed over time at refineries is attributed by the industry, at least in part, to the increase in the number of wells that are fractured with these types of hydrocarbon-based phosphates. As mentioned, this has become a major concern for refiners due to consequential fouling problems. The fouling problems observed can be particularly problematic because the preferred cleaning involves a combination of mechanical and chemical methods. The use of such methods can be costly because refining distillation units usually have to be shut down to carry out the cleaning, thereby leading to lost refining production.

One method of combating the phosphorus problem is to distill the crude. However, this is thought to be not very effective. It is also expensive and logistically difficult in some cases because getting the crude and the hydrocarbon flowback fluids to a treatment facility can be cumbersome. Also, hydrocarbon flowback fluids flowback over time; therefore, the time to treat these fluids can be difficult. Other solutions involve not using phosphorus based gelling agents in subterranean treatment fluids; however, other gelling agents have not proven to work as well for oil-based fluids. Another solution would be to remove or reduce the phosphorus from the crude or hydrocarbon flowback fluids, but this has proven difficult as well.

To combat potential fouling problems, it is desirable to have reliable crude streams. Moreover, there are governmental regulations in place that are directed to limits on volatile phosphorus in crude streams that impact crude suppliers.

SUMMARY

The present invention relates to methods and compositions useful in treating crude sources, and more specifically, to methods and compositions useful in reducing the concentration of phosphorus in crude streams recovered from subterranean formations. Additionally, the invention relates to reducing volatile phosphorus in hydrocarbon flowback fluids.

In some embodiments, the present invention provides methods that include a method comprising: providing a crude stream or a hydrocarbon flowback fluid; optionally testing the crude stream or the hydrocarbon flowback fluid for total phosphorus content; optionally testing the crude stream or hydrocarbon flowback fluid for volatile phosphorus content; adding a solution comprising a trivalent metal ion to the crude stream or the hydrocarbon flowback fluid; adding a sufficient amount of a caustic solution to the crude stream or the hydrocarbon flowback fluid to raise the pH of the stream or the fluid to about 8 or more; allowing at least a plurality of precipitates to form; removing at least one precipitate; and forming a clean crude stream or a clean hydrocarbon flowback fluid.

In some embodiments, the present invention provides methods that include a method comprising: providing a crude stream or a hydrocarbon flowback fluid; optionally testing the crude stream or the hydrocarbon flowback fluid for volatile phosphorus content; adding a solution comprising a trivalent metal ion to the crude stream or the hydrocarbon flowback fluid; adding a sufficient amount of a caustic solution to the crude stream or the hydrocarbon flowback fluid to raise the pH of the stream or fluid to about 8 or more; allowing at least a plurality of precipitates to form in the stream or fluid; removing at least one precipitate from the stream or fluid; and forming a clean crude stream or a clean hydrocarbon flowback fluid.

In some embodiments, the present invention provides a clean hydrocarbon flowback fluid made by a method comprising: providing a hydrocarbon flowback fluid; optionally testing the hydrocarbon flowback fluid for volatile phosphorus content; adding a solution comprising a trivalent metal ion to the hydrocarbon flowback fluid; adding a sufficient amount of a caustic solution to the hydrocarbon flowback fluid to raise the pH of the hydrocarbon flowback fluid to about 8 or more; allowing at least a plurality of precipitates to form; removing at least one precipitate; and forming a clean hydrocarbon flowback fluid.

In some embodiments, the present invention provides a clean crude stream made by a method comprising: providing a crude stream; optionally testing the crude stream for volatile phosphorus content; adding a solution comprising a trivalent metal ion to the crude stream; adding a sufficient amount of a caustic solution to the crude stream to raise the pH of the crude stream to about 8 or more; allowing at least a plurality of precipitates to form; removing at least one precipitate; and forming a clean crude stream.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods and compositions useful in treating crude sources, and more specifically, to methods and compositions useful in reducing the concentration of phosphorus in crude streams recovered from subterranean formations. Additionally, the invention relates to reducing volatile phosphorus in hydrocarbon flowback fluids.

One of the many advantages of the present invention (many of which are not discussed or eluded to herein) is that in certain embodiments, the methods presented can be performed at a well site. The term "well site" as used herein refers to the location surrounding and including a well bore. Therefore, the complications involved with transporting the crude or the hydrocarbon flowback fluids can be reduced. Additionally, another one of the many advantages presented by this invention is that the crude processed using the methods of the invention should meet current regulatory standards for phosphorus content, and therefore, should not present a potential bottleneck in the process of oil through refining. Another possible advantage may be that the fluids processed using the methods and compositions of the present invention may be able to be reused as treatment fluids (e.g., as fracturing fluids) in subterranean applications because the gelling agent has been removed. Additionally, the methods and compositions of the present invention should present less cumbersome and less expensive solutions to the phosphorus fouling problems. Other advantages and potential advantages offered by the present invention will be evident to one skilled in the art with the benefit of this disclosure.

In some embodiments, the present invention provides methods that include a method comprising: (optionally) testing a crude stream or a hydrocarbon flowback fluid for total phosphorus content; (optionally) testing the crude stream or hydrocarbon flowback fluid for volatile phosphorus content; adding a mole excess of a solution comprising a trivalent metal ion based on the volatile phosphorus content of the crude stream or the hydrocarbon flowback fluid; adding a sufficient amount of a caustic solution to the crude stream or the hydrocarbon flowback fluid to raise the pH of the stream or the fluid to about 8 or more; allowing at least a plurality of precipitates to form; removing at least one precipitate; and forming a clean crude stream or a clean hydrocarbon flowback fluid.

In some embodiments, the method may involve first testing a crude stream or a hydrocarbon flowback fluid for total phosphorus content, and/or testing the crude stream or hydrocarbon flowback fluid for volatile phosphorus content. In some embodiments of the methods of the present invention, at least one of these steps may be performed after a clean crude stream or a clean hydrocarbon flowback fluid has been formed, e.g., to determine the efficiency of the method.

In some embodiments, the present invention provides methods that include a method comprising: testing a crude stream or a hydrocarbon flowback fluid for volatile phosphorus content; adding a mole excess of a solution comprising a trivalent metal ion based on the volatile phosphorus content of the crude stream or the hydrocarbon flowback fluid; adding a sufficient amount of a caustic solution to the crude stream or the hydrocarbon flowback fluid to raise the pH of the stream or fluid to about 8 or more; allowing at least a plurality of precipitates to form in the stream or fluid; removing at least one precipitate from the stream or fluid; and recovering a clean crude stream or a clean hydrocarbon flowback fluid.

In some embodiments, the methods may involve using the crude stream or the clean hydrocarbon flowback fluid in a subterranean application, such as a fracturing application.

In some embodiments, the present invention provides compositions that include a clean hydrocarbon flowback fluid made by a method comprising: providing a hydrocarbon flowback fluid; optionally testing the hydrocarbon flowback fluid for volatile phosphorus content; adding a mole excess of a solution comprising a trivalent metal ion based on the volatile phosphorus content of the hydrocarbon flowback fluid; adding a sufficient amount of a caustic solution to the hydrocarbon flowback fluid to raise the pH of the stream to about 8 or more; allowing at least a plurality of precipitates to form; removing at least one precipitate; and forming a clean hydrocarbon flowback fluid.

In some embodiments, the present invention provides compositions that include a clean hydrocarbon flowback fluid made by a method comprising: providing a hydrocarbon flowback fluid; optionally testing the hydrocarbon flowback fluid for volatile phosphorus content; adding a mole excess of a solution comprising a trivalent metal ion based on the volatile phosphorus content of the hydrocarbon flowback fluid; adding a sufficient amount of a caustic solution to the hydrocarbon flowback fluid to raise the pH of the stream to about 8 or more; allowing at least a plurality of precipitates to form; removing at least one precipitate; and forming a clean hydrocarbon flowback fluid.

In some embodiments, the present invention provides compositions that include a clean crude stream made by a method comprising: providing a crude stream; optionally testing the crude stream for volatile phosphorus content; adding a mole excess of a solution comprising a trivalent metal ion based on the volatile phosphorus content of the crude stream; adding a sufficient amount of a caustic solution to the crude stream to raise the pH of the stream to about 8 or more; allowing at least a plurality of precipitates to form; removing at least one precipitate; and forming a clean crude stream.

Testing a crude stream or a hydrocarbon flowback fluid for total phosphorus content can be accomplished by any suitable technique. As used herein, the term "total phosphorus content" refers to the weight percent at a ppm level of phosphorus in solution (e.g., in a stream or fluid), whether volatile or not. An Inductively Coupled Plasma ("ICP") test is an example of a suitable method for determining total phosphorus content.

This is an optional step in the methods of the present invention, but it may be useful in some instances where it is desirable to know the total phosphorus content of the stream or fluid. Determining the total phosphorus content of a crude stream or a hydrocarbon flowback fluid may be useful in complying with some environmental regulations, especially where the environmental regulation is directed to total phosphorus content of the stream or fluid. This can be done, for example, to validate a hypothesis regarding the phosphorus content of the stream or fluid, or to confirm the effectiveness of the treatment once the stream or fluid has been treated.

Testing the crude stream or hydrocarbon flowback fluid for volatile phosphorus content may be accomplished by any suitable method. Theoretically, this step is also optional because one may assume that volatile phosphorus is present. However, performing this step of the method is generally advisable in order to confirm that volatile phosphorus is present. Additionally, many of the new applicable regulations dictate that oil will be tested for total phosphorus content as well as volatile phosphorus content, so doing both steps may be desirable. Suitable techniques for testing the volatile phosphorus content of a stream or fluid include distilling a sample according to ASTM D86, and then measuring the total phosphorus on the distillate; this may be reported as volatile phosphorus. Other methods also may be suitable.

By way of description, in some circumstances, the initial screening tests of some of the environmental regulations look at total phosphorus content only. If the test fails the initial screening test, then a more detailed test often is conducted to determine if a volatile phosphorus specification is also exceeded. As further explanation, generally there may be only one test and that is for total phosphorus content. If one measures the total phosphorus content of the oil sample as received, it may be reported as total phosphorus content. However, if one distills the sample according to ASTM D86 method, and then measures the total phosphorus on the distillate, this may be reported as volatile phosphorus. This may be performed to simulate behavior in refinery distillation towers with "volatile phosphorus" according to ASTM D86, giving a good correlation to behavior seen in more expensive and representative pilot plant testing, and actual refinery towers.

In order to treat the phosphorus in the stream or fluid, one may then add a mole excess based on the phosphorus content of the crude stream or the hydrocarbon flowback fluid of a solution comprising suitable trivalent metal ion(s). If the stream or fluid has not been tested to determine its actual phosphorus content, then the addition of the solution may be based on an assumed maximum possible phosphorus concentration in the stream or fluid. It is believed that the trivalent metal ions will react with the phosphorus monoesters and/or diesters to form complexes that will precipitate, which can then be removed through a suitable separation technique. Suitable trivalent metal ions include iron III and aluminum III. Suitable commercially available products include "MO-86" and "MO-86M," which are available from Halliburton Energy Services, Inc. in Duncan, Okla. A suitable concentration of trivalent metal ion to phosphorus in terms of molar ration may be about 3:1 mole % or more. However, a ratio of about 1:1 mole % may be suitable as well. In deciding on how much of the trivalent metal ion to use, it may be wise to consider the cost of the trivalent metal ion source. Using less rather than more could represent a cost savings.

Next, a sufficient amount of a caustic solution may be added to the crude stream or the hydrocarbon flowback fluid to raise the pH of the stream or the fluid to about 8 or more. The amount of caustic solution to add depends on the concentration of the complexes formed with the trivalent metal ions in the stream or fluid. In some embodiments, about 0.5% to about 10% may be added, based on the volume of the stream or fluid. Using less rather than more may be desirable in terms of cost. Other amounts may be suitable as well. Any caustic solution that can elevate the pH of the stream or fluid to a level of about 8 or more, preferably about 10 or more, is suitable for use in the methods of the present invention. Particularly suitable caustic solutions may include sodium hydroxide or potassium hydroxide. A carbonate solution also may be suitable. Other oxides such as magnesium oxide could be used as well. This is thought to insolubilize the trivalent metal ion complexes such that they will precipitate out. It is also possible that if the caustic solution is strong enough and the conditions are conducive, that the triesters may be hydrolyzed here. However, this is uncertain because there is debate regarding the presence of the triesters, and further, whether this would have any effect.

Removing at least one precipitate from the stream or fluid may involve any suitable separation technique for removing precipitates from fluids. In some embodiments, the precipitates may be allowed to settle to the bottom of the tank in which the stream or fluid is being treated and then the stream or fluid may be drained off. In some embodiments, the precipitates may be filtered from the stream or fluid. In other embodiments, a centrifuge may be used. The precipitates may be disposed of as waste products or may be recycled if a suitable use is available.

Once the precipitates are removed, a clean crude stream or a clean hydrocarbon flowback fluid may be formed. A "clean crude stream" includes a crude stream substantially free of volatile phosphorus. A "clean hydrocarbon flowback fluid" includes a hydrocarbon flowback fluid that is substantially free of volatile phosphorus. Any suitable means of forming either the stream or fluid can be used, including recovering it from a source. The technique chosen may depend on the method used to remove the precipitates from the stream or fluid. The clean stream or fluid may be sent to a refiner for further processing, or in some instances, it may be used in a subterranean application. In some embodiments, a clean crude stream or a clean hydrocarbon flowback fluid may have a volatile phosphorus concentration of about 10 ppm or less.

If desired, the recovered stream or fluid may be tested to determine the total phosphorus content and/or the volatile phosphorus content in the stream or fluid. Such tests may confirm the efficiency of the process. This may be advisable, for instance, before putting the stream or fluid into a pipeline. Some suitable testing methods are described above.

The methods of the present invention, in some embodiments, may be performed at a well site. In other embodiments, the methods may be performed at a facility to which the crude stream or hydrocarbon flowback fluid is transported. However, this is not considered the optimal means of performing the methods because many of the advantages with respect to ease of use and expense may not be achieved.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
   (a) providing a phosphorus-containing fluid comprising at least one of a crude stream or a hydrocarbon flowback fluid;
   (b) testing the phosphorus-containing fluid for volatile phosphorus content;
   (c) adding a solution comprising a trivalent metal ion to the phosphorus-containing fluid;
   (d) after step (c), adding a sufficient amount of a caustic solution to the phosphorus-containing fluid to raise the pH of the fluid to about 8 or more;
   (e) after step (d), allowing at least a plurality of phosphorus-containing precipitates to form in the phosphorus-containing fluid; and
   (f) removing at least one precipitate to yield a clean fluid.

2. The method of claim 1 wherein the method is performed at a well site.

3. The method of claim 1 further comprising testing the clean fluid to determine either a total phosphorus content or a volatile phosphorus content of the clean fluid.

4. The method of claim 1 further comprising using the clean fluid in a subterranean application.

5. The method of claim 1 wherein step (b) involves an inductively coupled plasma test.

6. The method of claim 1 wherein the trivalent metal ion comprises an iron III ion or an aluminum III ion.

7. The method of claim 1 wherein the caustic solution comprises at least one caustic chosen from the group consisting of: sodium hydroxide; potassium hydroxide; carbonate; and magnesium oxide.

8. The method of claim 4 wherein the subterranean application is a fracturing application.

9. The method of claim 1 further comprising sending the clean fluid to a refiner for processing.

10. The method of claim 1 further comprising the step of testing the phosphorus-containing fluid for total phosphorus content before step (d).

11. The method of claim 1 further comprising repeating step (b) after step (f).

12. The method of claim 1 wherein the solution comprising a trivalent metal ion is added to the phosphorus-containing fluid in an amount such that the molar ratio of metal to phosphorus is at least about 3:1.

13. The method of claim 1 wherein the caustic solution is added to the phosphorus-containing fluid in an amount from about 0.5% to about 10% by volume of the phosphorus-containing fluid.

14. The method of claim 1 wherein the pH of the phosphorus-containing fluid is raised to about 10 or more in step (d).

15. A method comprising:
   (a) providing a phosphorus-containing fluid comprising at least one of a crude stream or a hydrocarbon flowback fluid;
   (b) adding a solution comprising a trivalent metal ion to the phosphorus-containing fluid;
   (c) after step (b), adding a sufficient amount of a caustic solution to the phosphorus-containing fluid to raise the pH of the fluid to about 8 or more;
   (d) after step (c), allowing at least a plurality of phosphorus-containing precipitates to form in the phosphorus-containing fluid; and
   (e) removing at least one precipitate to yield a clean fluid.

16. A method consisting of:
   (a) providing a phosphorus-containing fluid comprising at least one of a crude stream or a hydrocarbon flowback fluid;
   (b) testing the phosphorus-containing fluid for volatile phosphorus content or total phosphorus content;
   (c) adding a solution comprising a trivalent metal ion to the phosphorus-containing fluid;
   (d) after step (c), adding a sufficient amount of a caustic solution to the phosphorus-containing fluid to raise the pH of the fluid to about 8 or more;
   (e) after step (d), allowing at least a plurality of phosphorus-containing precipitates to form in the phosphorus-containing fluid; and
   (f) removing at least one precipitate to yield a clean fluid.

* * * * *